(12) United States Patent
Patel et al.

(10) Patent No.: US 6,456,510 B1
(45) Date of Patent: Sep. 24, 2002

(54) UNIQUE METHOD OF REDUCING LOSSES IN CIRCUITS USING $V^2$ PWM CONTROL

(75) Inventors: Raoji Patel, Sunnyvale, CA (US); Robert Wolf, Nashua, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/653,133

(22) Filed: Aug. 31, 2000

(51) Int. Cl.[7] ............................................. H02M 3/335

(52) U.S. Cl. ................... 363/21.06; 363/21.08; 713/340

(58) Field of Search .................. 363/21.08, 21.09, 363/21.1, 21.14, 21.16, 21.17, 21.18, 21.06; 713/340, 300

(56) References Cited

U.S. PATENT DOCUMENTS

| | | | | |
|---|---|---|---|---|
| 4,686,617 A | * | 8/1987 | Colton | 363/97 |
| 5,036,452 A | * | 7/1991 | Loftus | 363/71 |

* cited by examiner

*Primary Examiner*—Shawn Riley
(74) *Attorney, Agent, or Firm*—Cesari and McKenna, LLP; Robert A. Cesari

(57) ABSTRACT

A regulated power supply in which square wave output of a switching rectifier is applied to a filter comprises a series inductor and a parallel capacitor. This filter lacks a series resistor. The ramp signal is developed across a second capacitor in series with a first resistor, and in parallel with the rectifier output. An amplifier adds the ramp signal to a signal representing the error in the DC output voltage of the power supply, producing an output that is fed to a control circuit. The control circuit in response generates a voltage control signal that controls the switching of the rectifier.

7 Claims, 10 Drawing Sheets

UNIQUE METHOD OF REDUCING LOSSES IN CIRCUITS USING V² PWM CONTROL

INCORPORATION BY REFERENCE OF RELATED APPLICATIONS

This patent application is related to the following co-pending, commonly owned U.S. Patent Applications, all of which were filed on even date with the within application for United States Patent and are each hereby incorporated by reference in their entirety:

U.S. patent application Ser. No. 09/652,644 entitled ADAPTIVE DATA PREFETCH PREDICTION ALGORITHM;

U.S. patent application Ser. No. 09/652,641 entitled IO SPEED AND LENGTH PROGRAMMABLE WITH BUS POPULATION;

U.S. patent application Ser. No. 09/652,458 entitled PARTITION FORMATION USING MICROPROCESSORS IN A MULTIPROCESSOR COMPUTER SYSTEM;

U.S. patent application Ser. No. 09/654,096 entitled SYSTEM AND METHOD FOR USING FUNCTION NUMBERS TO INCREASE THE COUNT OF OUTSTANDING SPLIT TRANSACTIONS;

U.S. patent application Ser. No. 09/652,984 entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180 entitled ONLINE ADD/REMOVAL OF SERVER MANAGEMENT INFRASTRUCTURE;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,459 entitled AUTOMATED BACKPLANE CABLE CONNECTION IDENTIFICATION SYSTEM AND METHOD;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

1. Field of the Invention

This invention generally relates to DC power systems, and in particular to a DC-to-DC power supply which uses pulse width modulation (PWM) control.

2. Background of the Invention

While several methods of regulating a DC supply are known in the art, one such method uses pulse width modulation (PWM) control for its attendant advantages of accuracy of control and reliability. PWM control of power supplies is found in a wide variety of applications including AC voltage control, control of inverters and converters, voltage regulation and similar applications. PWM is used also in DC power supply control such as for instance in the voltage control of DC-to-DC power supplies. Regulated DC power supplies are indispensable to the operation of high speed processors, which has high transient loads.

PWM control per se, as used in different applications is known in prior art as exemplified for instance in U.S. Pat. No. 4,387,421 to Zach et al., and U.S. Pat. No. 5,986,426 to Rowan. Other examples of PWM control can be found in U.S. Pat. Nos. 4,626,979 to JaQuay, U.S. Pat. No. 5,777,503 to Richard A. Frank of Compaq Corporation, U.S. Pat. No. 5,929,606 to Richard A. Frank of Compaq Corporation, U.S. Pat. No. 6,088,490 to Iwata et al., U.S. Pat. No. 5,208,559 to Jordan, U.S. Pat. No. 5,534,889 to Daniel B. Reents et al., U.S. Pat. No. 5,272,327 to Nathan A. Mitchell et al., and U.S. Pat. No. 5,977,942 to Dale S. Walker et al. of Compaq Corporation.

In certain known systems of PWM control, a resistor (which may be an etched metallic member on a printed circuit board) is connected in series with an output inductor to provide adaptive voltage positioning. However, there is wastage of power and lack of control in such systems because of high $I^2R$ losses in the resistor and with its variation of resistance with temperature.

SUMMARY OF THE INVENTION

The $V^2$ control technique uses a ripple voltage developed across an equivalent series resistance (ESR) of an output capacitor $C_{out}$ as a ramp voltage in the PWM control loop. ESR is an inherent capacitor resistance. The ramp voltage is proportional to the AC current through the main inductor $L_1$ and is offset by the value of the DC output voltage. This control scheme inherently compensates for variation either line or load conditions since the ramp signal is generated from the output voltage itself. However, using the output ESR resistance limits the transient response of the DC to DC converter. To improve the transient response, it is desirable to make the ESR resistance as small as possible. However, if the ESR resistance is too small there will not be sufficient ripple voltage generated to form the ramp signal for the $V^2$ control technique. In accordance with the invention, a resistor and a capacitor coupled in series is placed across a square voltage waveform intermediate output of the DC power supply. Wherein the RC time constant of the resistor and the capacitor synthesizes the ramp signal from the square waveform.

In addition, in certain PWM control systems, a resistor is connected in series with an output inductor to provide adaptive voltage positioning. However, there is wastage of power and lack of control in such systems because of high $I^2R$ losses in the resistor. According to the embodiment, a current transformer is used to sense a primary current which is proportional to the output current. Thus, if the output current increases due to increase in transient load, the primary current increases proportionally. Conversely, if the output current decreases due to decrease in transient load, the primary current decreases proportionally. The primary current feeds into a resistor causing a voltage drop across the resistor. This voltage is fed into the feedback loop of the PWM control circuit. Thus when the voltage across the resistor increases, that voltage feeds into the feedback loop causing the output voltage $V_{out}$ to decrease. Conversely, if the voltage across the resistor decreases, this voltage feeds into feedback loop and causes the output voltage $V_{out}$ to increase. In this manner adaptive voltage positioning is obtained without having a resistor directly in the path of the output current.

BRIEF DESCRIPTION OF THE DRAWINGS

The above technique is related to a control method termed a V²® control technique and obviates the wastage of power in the series resistor of the known systems. The present invention, while considerably minimizing power dissipation, enhances the accuracy of the PWM control by judicially having a current transformer, a capacitor in its secondary and a design choice of the resistances so as to achieve optimal control and performance.

DETAILED DESCRIPTION OF AN ILLUSTRATIVE EMBODIMENT

FIGS. 1–8 are intended to provide an overview of a computer configuration cooperating with input/output (I/O) units, wherein each processor could use for its DC supply needs the PWM control of the present invention.

Figure 1:
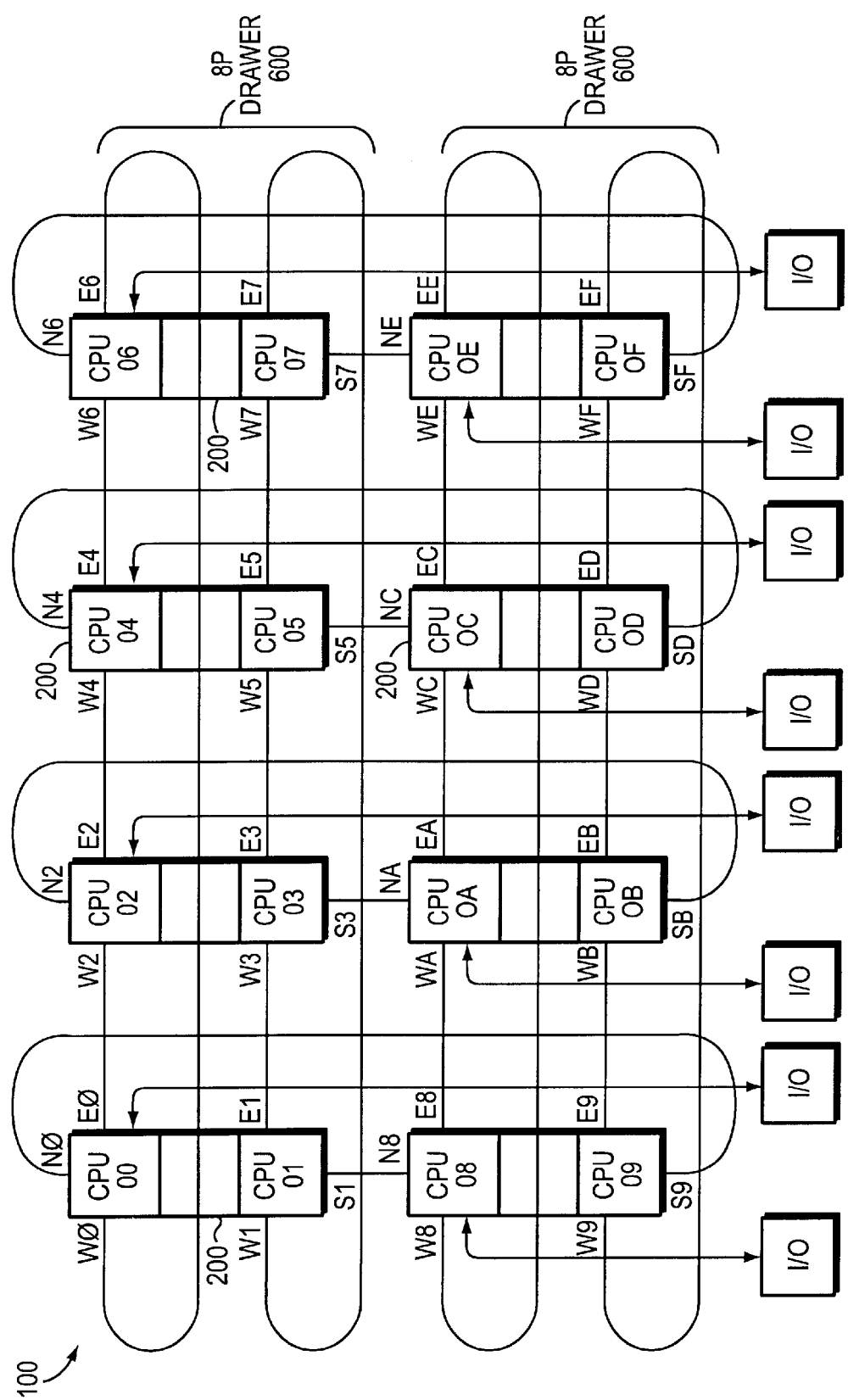
FIG. 1 is a schematic block diagram of a Symmetrical Multiprocessor (SMP) system comprising a plurality of dual processor (2P) modules interconnected to form a two dimensional (2D)-torus mesh configuration.

FIG. 1 is a schematic block diagram of a symmetrical multiprocessor (SnP) system 100 comprising a plurality of processor modules 200 interconnected to form a two dimensional (2D)-torus mesh configuration. Each processor module 200 comprises two central processing units (CPUs) with connections for two input/output (I/O) ports along with 6 inter-processor (IP) network ports. The network ports are preferably referred to as North (N), South (S), East (E) and West (W) compass points. The North-South (NS) and East-West (EW) compass point connections create a (manhattan) grid. Additionally, the outside ends of the mesh wrap-around and connect to each other. I/O traffic enters the 2D torus via I/O channel connections between the CPUs and I/O subsystem. Each compass point is coupled to an IP channel that comprises 32 bits of data and a 7-bit ECC code for a total of 39 bits of information transfer.

Figure 2:
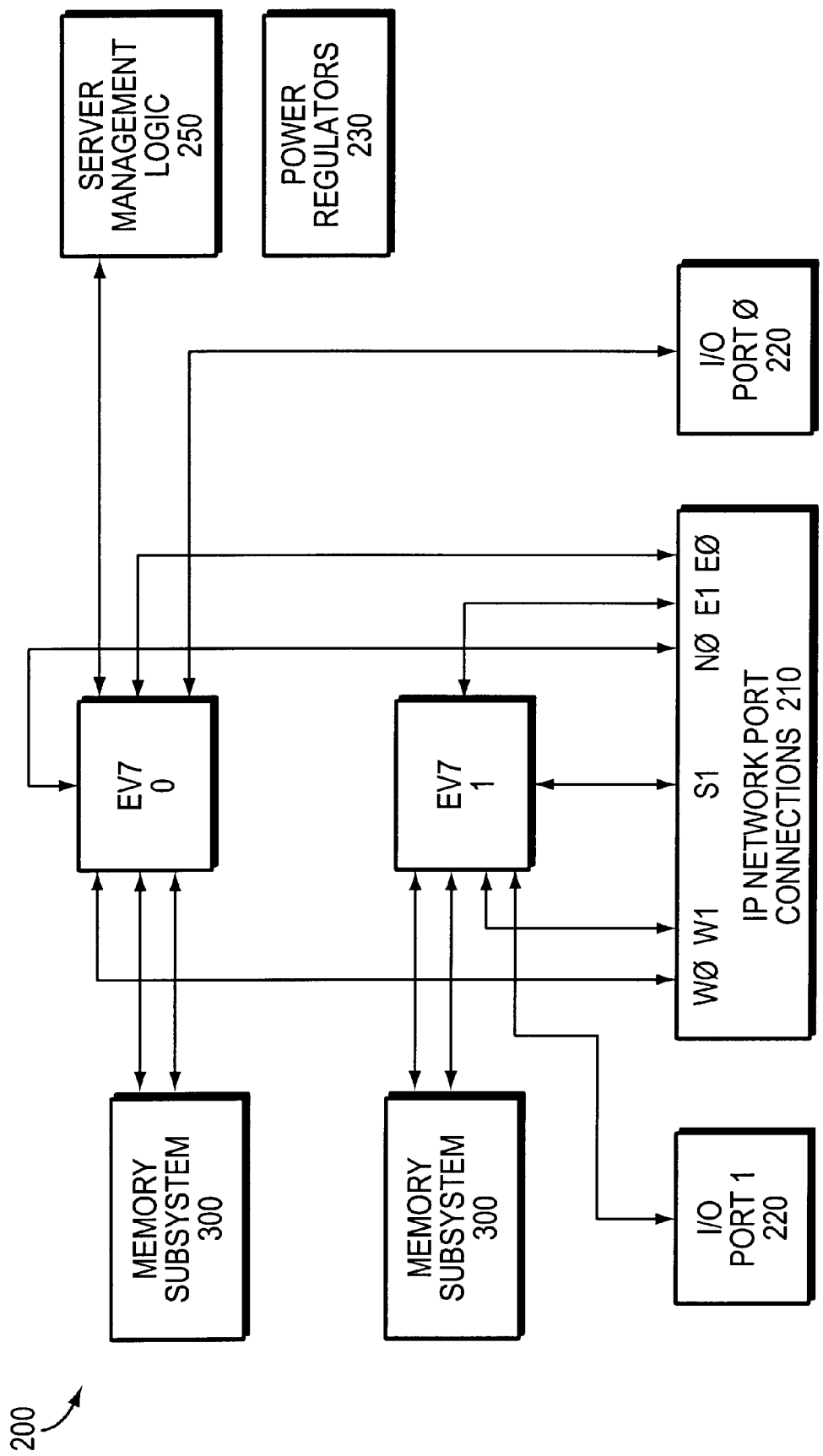
FIG. 2 is a schematic block diagram of a 2P module of FIG. 1.

FIG. 2 is a schematic block diagram of the dual CPU (2P) module 200. As noted, the 2P module 200 comprises 2 CPUs with connections 210 for the IP ("compass") network ports and an I/O port 220 associated with each CPU. The 2P module 200 also includes power regulators 230, system management logic 250 and memory subsystem 300 coupled to 2 memory ports of each CPU, wherein each CPU may have up to 16 gigabytes (GB) of memory per processor using 512 megabit (Mb) RDRAMs. In accordance with an aspect of the present invention, the system management logic 250 cooperates with a server management system to control functions of the SMP system. Each of the N, S, E and W compass points, along with the I/O and memory ports use clock-forwarding, i.e., forwarding clock signals with the data signals, to increase data transfer rates and reduce skew between the clock and data.

Each CPU is preferably an EV7 processor that includes an EV6 core with "wrapper" circuitry comprising 2 memory controllers, an I/O interface and 4 network ports. In the illustrative embodiment, the EV7 address space is 44 physical address bits and supports up to 256 processors and 256 IO7s in 16 GB mode. In 32 GB mode, the EV7 supports up to 128 processors with memory. The EV6 core preferably incorporates a traditional reduced instruction set computer (RISC) load/store architecture. In the illustrative embodiment described herein, the EV6 cores are generally the Alpha® 21264 processor chips manufactured by Compaq Computer Corporations, with the addition of a 1.75 megabyte (MB) 7-way associative internal cache and CBOX, the latter providing integrated cache controller functions to the EV7 processor. However, it will be apparent to those skilled in the art that other types of processor chips may be advantageously used. The EV7 processor also includes a RBOX that provides integrated routing/networking control functions with respect to the compass points. The EV7 further includes a ZBOX that provides integrated memory controller functions for controlling the memory subsystem.

The memory subsystem 300 is preferably implemented using RAMBUS technology and, accordingly, the memory space is generally divided between 2 RAMBUS controllers. However, an EV7 processor can operate with 0, 1 or 2 RAMBUS controllers. As described further herein, each memory controller manages either 4 or 5 RAMBUS channels with a fifth channel optionally available for use in high reliability systems. At 800 megahertz (MHz), the RAMBUS channels can deliver a peak 12.8 GB per second of bandwidth. Each IP channel coupled to the IP network port can deliver a raw 3.2 GB per second at 800 MHz. Each I/O channel can deliver a raw bandwidth of 1.6 GB per second at 400 MHz. Thus, the total raw data bandwidth into/out of each EV7 is 41.6 GB per second. The RAMBUS channels are bi-directional and all other channels are unidirectional.

Figure 3:
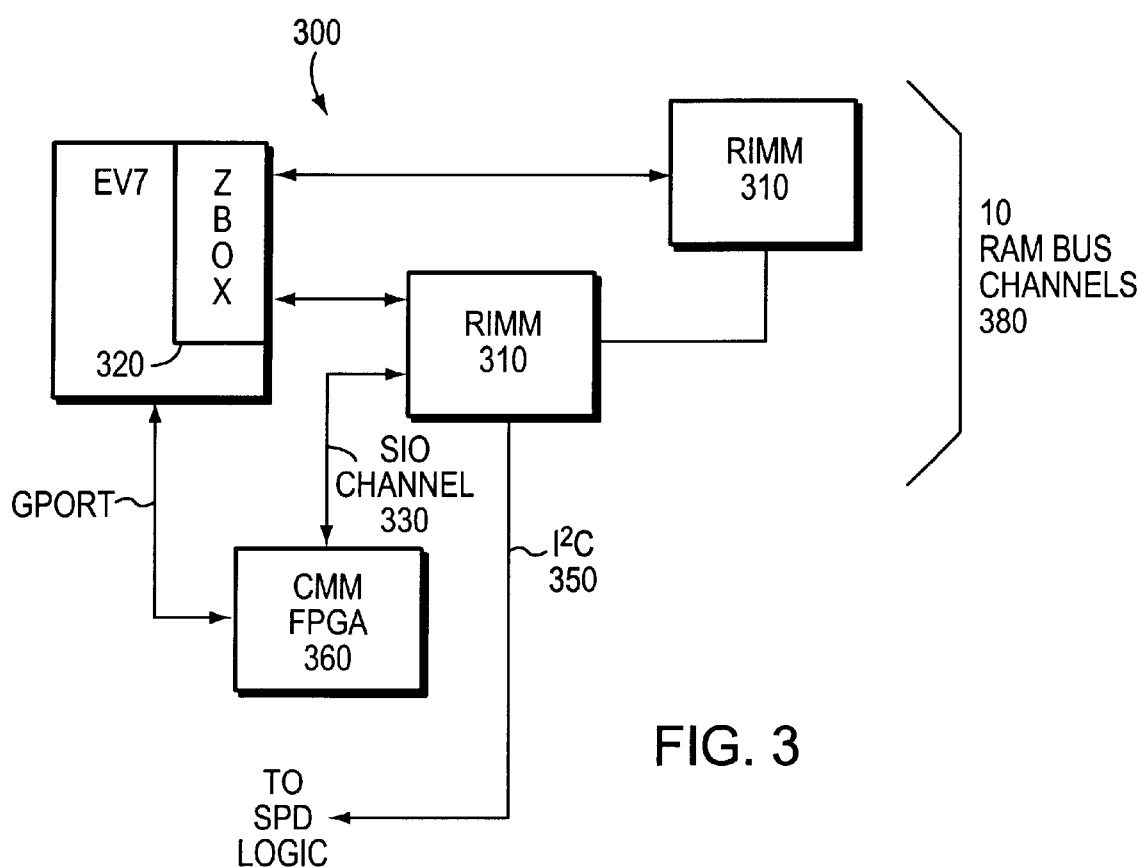
FIG. 3 is a schematic diagram of a memory subsystem of the SMP system.

FIG. 3 is a schematic diagram of the SMP memory subsystem 300 illustrating connections between the EV7 and RAMBUS memory modules (RIMMs 310). Software configures the memory controller logic (ZBOX 320) within the EV7 and the logic on each RIMM 310 before testing and initializing memory. Specifically, the memory subsystem components include 2 RAMBUS memory controllers (not shown) within the ZBOX 320, a RIMM 310 containing RDRAM memory devices, a serial I/O (SIO 330) channel to the RDRAMs, serial presence detect (SPD) logic (EEPROM data) via an I²C bus 350, and a CPU management module (CMM) field programmable gate array (FPGA 360) that interfaces between a CMM (not shown) and the EV7 processor.

In the illustrative embodiment, each EV7 has a total of 10 RAMBUS channels 380 organized into 2 memory sets or banks, each containing 5 RAMBUS channels. Each memory bank includes 4 RAMBUS data channels capable of providing read/write access by the EV7 processor to 64 bytes of data stored in the memory. The 5th RAMBUS channel is used for reliability purposes. Each memory bank may be configured as a random array of independent disks (RAID) memory.

Figure 4:
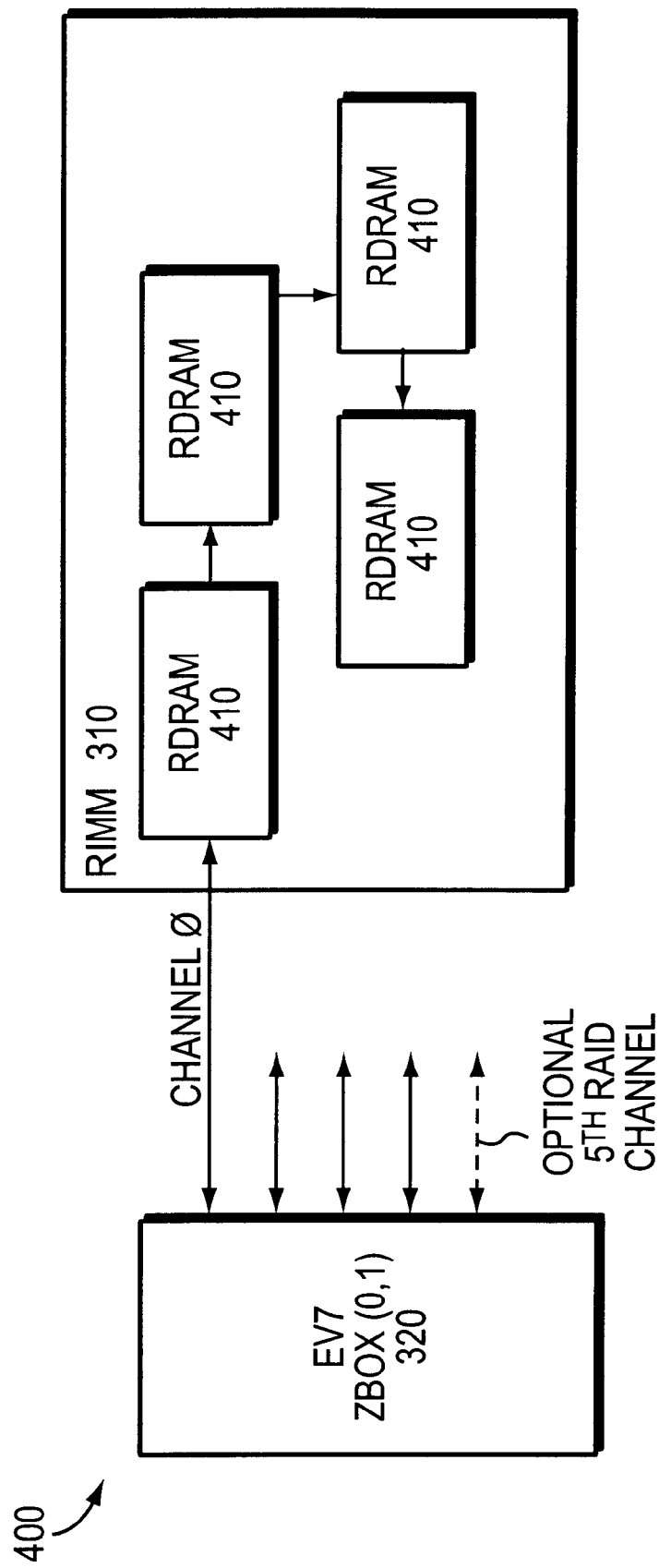
FIG. 4 is a schematic block diagram showing the organization of the memory subsystem of FIG. 3.

FIG. 4 is a schematic block diagram showing the RAMBUS memory organization 400. Both EV7 memory controllers (ZBOX0/ZBOX1) and the RDRAMs 410 contain programmable elements which configure the addressing and timing of each RDRAM on each channel. The RIMMs are visible to system software via 3 separate paths: the SPD logic (via the I$^2$C bus 350), the SIO channel 330 and the RAMBUS channels 380. The SPD path provides a data structure contained within a serial EEPROM located on each RIMM 310. The SIO path provides access to programmable timing and configuration registers contained on the RDRAM devices. The RAMBUS channel is the row/column serial data path to the RDRAMs. Each channel is connected to a physical RIMM that may contain up to 32 RDRAM devices.

Figure 5:
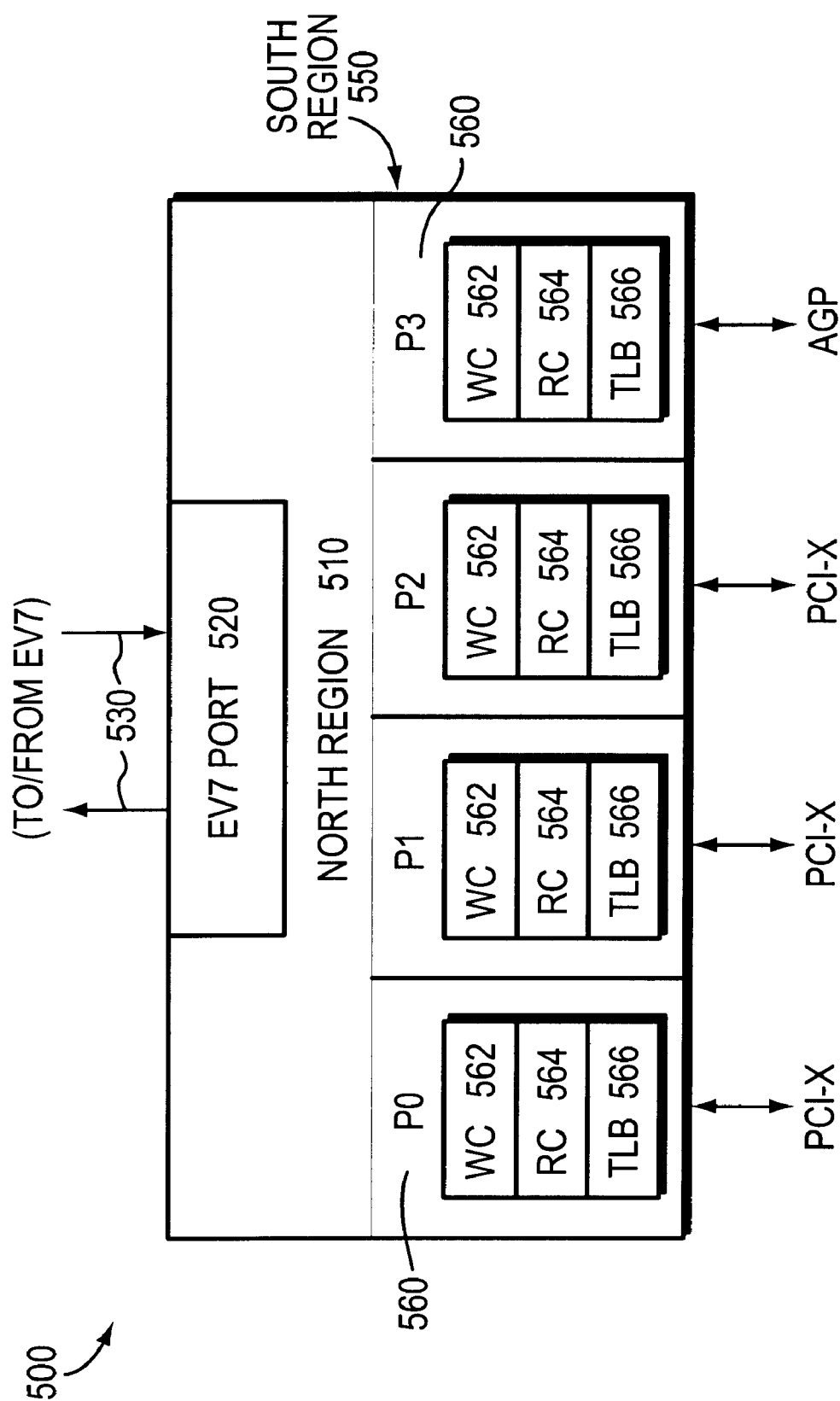
FIG. 5 is a schematic block diagram of an IO7 of an I/O subsystem of the SMP system.

FIG. 5 is a schematic block diagram of an IO7 device 500 that provides a fundamental building block for the SMP I/O subsystem. The IO7 is preferably implemented as an application specific integrated circuit (ASIC) using IBM SA27E ASIC technology and packaged in a 748-pin column grid array CCGA package. Each EV7 processor supports one I/O ASIC connection; however, there is no requirement that each processor have an I/O connection. In the illustrative embodiment, the I/O subsystem includes a PCI-x I/O expansion box with hot-swap PCI-x and AGP support. The PCI-x expansion box includes an IO7 plug-in card that spawns 4 I/O buses.

The IO7 500 comprises a North circuit region 510 that interfaces to the EV7 processor and a South circuit region 550 that includes a plurality of I/O ports 560 (P0–P3) that interface to standard I/O buses. An EV7 port 520 of the North region 510 couples to the EV7 processor via 2 unidirectional, clock forwarded links 530. Each link 530 has a 32-bit data path that operates at 400 Mbps for a total bandwidth of 1.6 GB in each direction. In the illustrative embodiment, 3 of the 4 I/O ports 560 interface to the PCI-x bus, while the 4th port interfaces to an AGP bus.

In accordance with an aspect of the present invention, a cache coherent domain of the SMP system extends into the IO7 and, in particular, to I/O caches located within each I/O port of the IO7. Specifically, the cache coherent domain extends to a write cache (WC 562), a read cache (RC 564) and a translation buffer (TLB 566) located within each I/O port 560. As described further herein, the caches function as coherent buffers in that the information contained within these data structures are not maintained for long periods of time.

Figure 6:
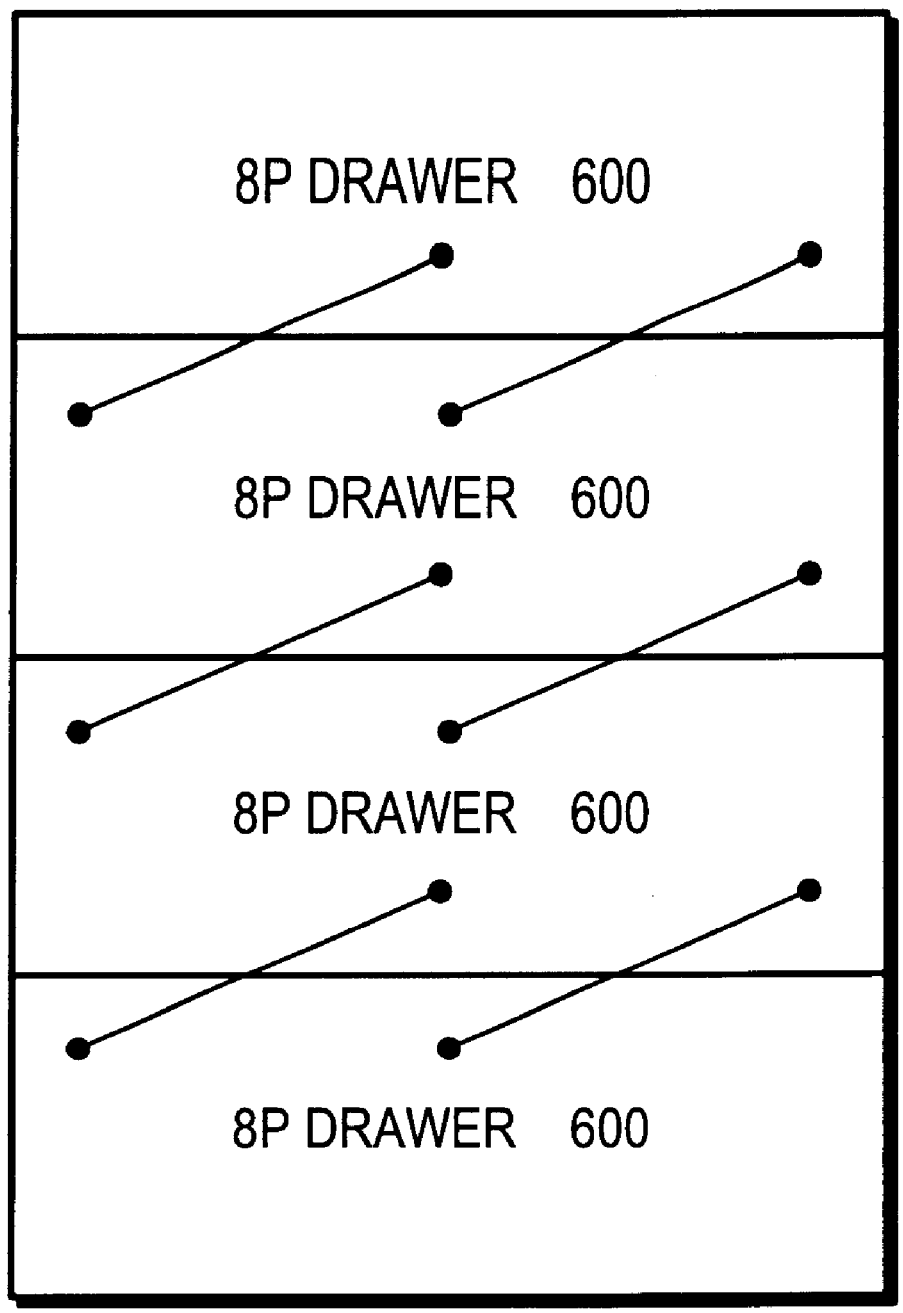
FIG. 6 is a schematic diagram of an illustrative embodiment of four (4) 8P drawers of the SMP system mounted within a standard 19-inch rack.

Referring again to the embodiment of FIG. 1, the 2D-torus configuration of the SMP system 100 comprises sixteen (16) EV7 processors interconnected within two 8P drawer enclosures 600. Specifically, there are four (4) 2P modules 200 interconnected by a backplane within each enclosure 600. This configuration is scalable by powers of 2 (EV7 processors) up to a total of 256 (or preferably 128) processors. In the illustrative embodiment, four (4) 8P drawers may be mounted within a standard 19-inch rack (2 meters in length) as shown in FIG. 6. Mounting 4 8P drawers in a single rack creates a substantial cabling problem when interconnecting the 32 processors within the 2D-torus configuration and when coupling the processors to the I/O subsystems via the IO7 devices 500 associated with the processors. In accordance with another aspect of the present invention, an efficient means for interconnecting cables among the 8P drawers of a fully-configured, 19-inch rack is provided.

Figure 7:
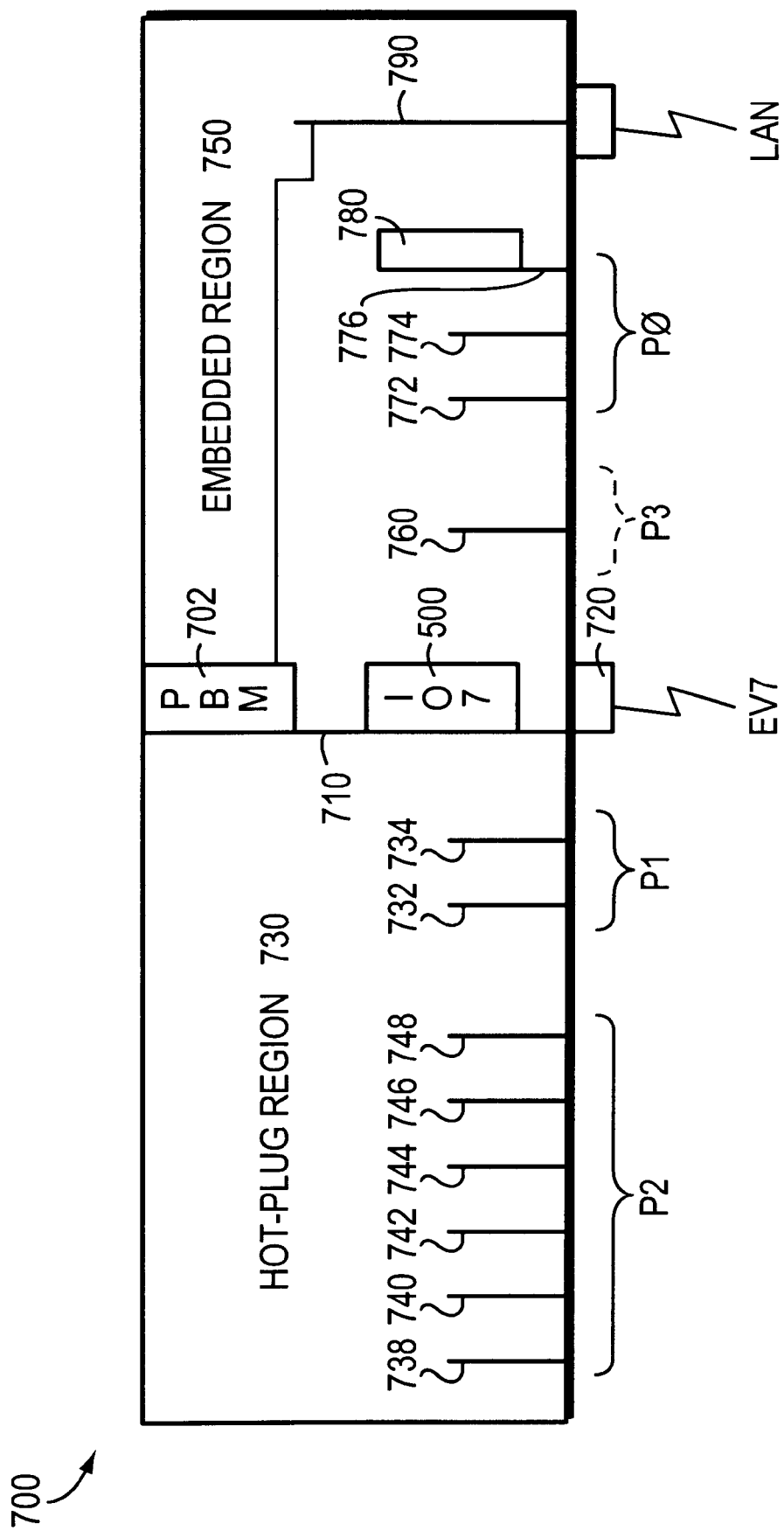
FIG. 7 is a schematic block diagram of an I/O drawer of the SMP system.

FIG. 7 is a schematic block diagram of an I/O drawer 700 of the SMP system which includes a first I/O riser card 710 containing an IO7 500, a connector 720 coupling the IO7 to the EV7 processor and a plurality of I/O buses. The speed of the I/O buses contained within the I/O drawer is a function of the length and the number of loads of each I/O bus. The I/O drawer is divided into two parts: a hot-plug region 730 and an embedded region 750. In the illustrative embodiment, there is a dedicated slot 760 adjacent to the I/O riser card 710 within the embedded region 750 that is dedicated to a 4x AGP Pro graphics card. Also included within the embedded region 750 are 3 standard, 64-bit PCI card slots 772–776, two of which may be occupied by additional AGP Pro cards. Otherwise, these PCslots are available for embedded I/O card options. For example, an I/O standard module card 780 may be inserted within one of the PCI slots 772–776.

Each I/O drawer 700 also includes power supplies, fans and storage/load devices (not shown). The I/O standard module card 780 contains an IDE controller for the storage/load devices, along with a SCSI controller for those devices and a universal serial bus that enables keyboard, mouse, CD and similar input/output functions. The embedded region 750 of the I/O drawer is typically pre-configured and not configured for hot-swap operations. In contrast, the hot-plug region 730 includes a plurality of slots adapted to support hot-swap. Specifically, there are 2 ports 732–734 of the hot plug region dedicated to I/O port one (P1 of FIG. 5) and 6 slots 738–748 dedicated to I/O port two (P2 of FIG. 5). Likewise, the dedicated AGP Pro slot 760 comprises port three (P3) and the 3 standard PCI slots 772–776 comprise port zero (P0). The I/O buses in the hot-plug region 730 are configured to support PCI and PCI-x standards operating at 33 MHz, 66 MHz, 100 MHz and/or 133 MHz. Not all slots are capable of supporting all of these operating speeds. In another aspect of the present invention, a technique is provided that enables all slots (under certain configurations) to support all operating frequencies described above.

Also included within the I/O drawer 700 and coupled adjacent to the IO7 is a PCI backplane manager (PBM 702). The PBM 702 is an integral part of a platform management infrastructure as described further herein. The PBM is coupled to a local area network (e.g., 10 base 100 Ethernet) by way of another I/O riser board 790 within the I/O drawer. The local area network (LAN) provides an interconnect for the server management platform that includes, in addition to the PBM, a CMM located on each 2P CPU module and an MBM (Marvel backplane manager) located in each 8P drawer. In a preferred embodiment of the invention the Ethernet LAN comprises twisted pair Ethernet media coupling to an Ethernet hub. Note that the cable coupling the IO7 to the EV7 on a 2P module may be up to 6 meters in length.

Figure 8:
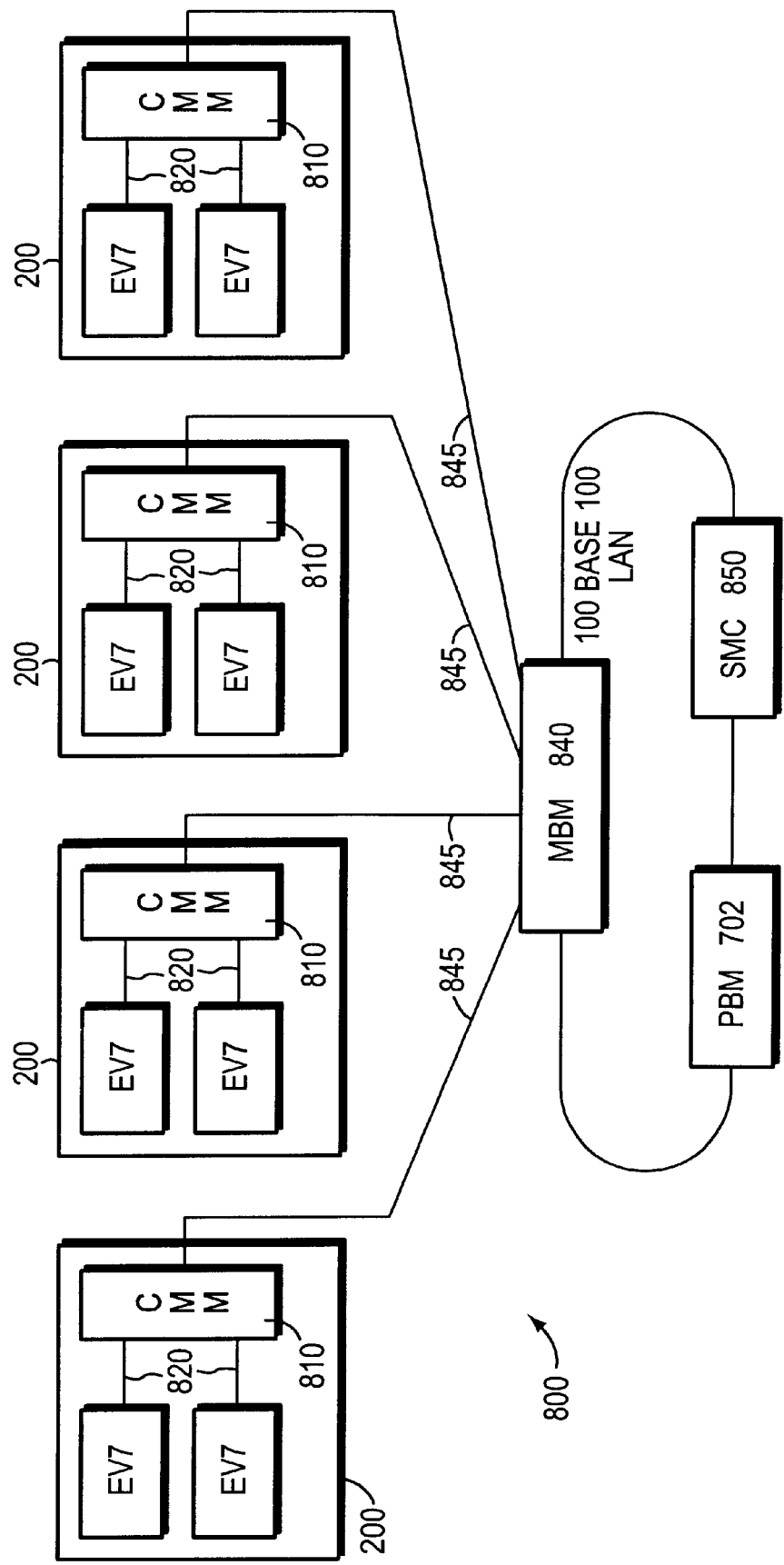
FIG. 8 is a schematic block diagram of a server management platform for the SMP system.

FIG. 8 is a schematic block diagram of the server management platform 800 for the SMP system. The server management comprises a 3-tier management scheme. At the lowest level, each 2P module 200 has a plug-in, CPU management module (CMM 810) that provides power and initialization control for the local 2P module. The CMM also interfaces directly to both EV7 processors via serial links 820 and provides debug, initialization, error collection and communication support to a higher, intermediate level of the service management hierarchy.

The intermediate level of service management is the "OC Box" management provided by the MBM 840, which is preferably an independent plug-in card within an 8P drawer 600. Each CMM 810 on each 2P module 200 within an 8P drawer 600 communicates with an MBM 840 through a point-to-point serial connection 845 that is preferably implemented in etch so as to obviate the need for a cable connection. The MBM controls the overall operation of the OC Box by functioning as the master of the CMMs. In the illustrative embodiment, each MBM controls 4 CMM devices within an 8P drawer.

The MBM 840 spawns a server manager network port that is connected to a service management LAN hub. The MBMs 840 preferably communicate with the PBMs 702 in the I/O drawers via a TCP/IP protocol over a server management LAN. In the illustrative embodiment, the server management platform is preferably implemented as a 10 base 100 (Ethernet) LAN, although similar types of local area network implementations, such as Token Ring or FDDI, may be advantageously used with the system.

A personal computer (PC) or similar network device connected to one of the ports of the service management LAN hub serves as a server management console (SMC 850). The SMC 850 provides the highest level of server management and, to the end, executes a platform management utility that provides a unified view of the entire SMP system for purposes of controlling the system, even if the system is divided into multiple hard partitions. From a physical implementation, the MBMs, PBMs and SMC are coupled to the service management hub; however, logically they are interconnected by the LAN.

The server management platform is used to bring up ("boot") the SMP system and create partitions. As used herein, a hard partition is defined as hardware resources capable of supporting a separate instance of an operating system. In addition, the server management platform facilitates hot-swap (insert/delete) of hardware resources into/from the system. For example, assume it is desirable to dynamically remove a 2P module 200 from the SMP system 100. The SMC 850 instructs the appropriate MBM 840 which, in turn, instructs the appropriate CMM 810 on the 2P module to power down its regulators 230 in preparation of removal of the module. It should be noted that the SMP system may "boot" and operate without a functioning SMC, but reconfiguration and complete system visibility may be lost if redundant SCMs are not connected and the single SCM fails or is otherwise disconnected.

All console functions for the SMP system are provided by the SMC node 850 on the LAN. In the case of a hard partitioned system, a logical console is provided for each hard partition. In the illustrative embodiment, the SMP system may be expanded up to 256 processors (within, e.g., 32 8P drawers) and 256 I/O drawers, wherein each I/O drawer 700 includes a PBM 702 and each 8P drawer 600 includes an MBM 840. Therefore, the server management platform is preferably implemented as a local area network to accommodate such expandability. In an alternate embodiment, the SMC may be implemented as a web server and the server management LAN may function as a virtual private network (VPN). In accordance with this embodiment, system management of the SMP system may be controlled remotely over a network, such as the Internet, through a firewall at the SMC console station.

Coherency

In the illustrative embodiment, a directory-based cache coherency policy is utilized in the SMP system. A portion of each memory data block ("cache line") is associated with the directory and, as such, contains information about the current state of the cache line, as well as an indication of those processors in the system holding copies of the cache line. The EV7 processor allocates storage for directory information by using bits in the RAMBUS memory storage. For example, there are 72 bytes of storage for each 64 bytes of data in a cache line, thereby leaving 8 additional bytes. A typical implementation allocates 1 byte of this excess storage for ECC coverage on the 8 bytes. The EV7 may alternatively allocate a 9-bit ECC on each 16 bytes of data.

If a processor on a 2P module 200 requests a cache line that is resident on another 2P module, the processor on the latter module supplies the cache line from its memory and updates the coherency state of that line within the memory. In accordance with the cache coherent I/O subsystem, when the IO7 500 issues a "read for ownership" request for cache line data, the requested data is delivered to both the IO7 and the "home" memory of that data. That is, the request for ownership of a cache line by the IO7 essentially translates into a write-through operation of that data to its home memory.

As noted, the TLB 566 located within each I/O port 560 on the IO7 500 is part of the system cache coherency domain and is utilized to translate addresses from the PCI (I/O) domain to the SMP system domain. In the illustrative embodiment, the PCI address space is 4 GB whereas the SMP system address space is 44 bits. A translation mechanism is thus needed to correlate locations in the smaller PCI address space with those of the larger SMP system address space. The I/O TLB 566 (or scatter-gather map) translates PCI addresses to the system addresses and maps those addresses throughout the larger SMP system space. Each entry of the I/O TLB is essentially a page table entry (PTE).

The TLBs 566 in the I/O subsystem are generally temporally "far away" from the SMP system processor and memory components. In order to avoid the complexity needed to bring the I/O subsystem into the system cache coherency domain, these I/O TLBs are typically not maintained in a coherent manner. Thus, in response to memory management software on the SMP system modifying a page table in memory, the I/O TLBs are typically flushed. Since there may be 4 TLBs (one in each I/O port) associated with each EV7 processor and there may be 256 processors in the SMP system, there may to be as many as 1000 TLBs that require invalidation upon a change to a page table. Accordingly, it is not desirable to have software manage I/O TLB coherence. In accordance with another aspect of the present invention, a cache coherent, I/O TLB (scatter-gather map) technique is provided.

Virtual Channels

The SMP system comprises a plurality of virtual channels including a request channel, a response channel, and I/O read channel, and I/O write channel and an error channel. Ordering within a processor with respect to memory is achieved through the use of memory barrier (MB) instructions, whereas ordering in the I/O subsystem is done both implicitly and explicitly. In the case of memory, references are ordered at the home memory of the cache line data in a directory in flight (DIF) data structure (table) of the EV7.

In the I/O subsystem, write operations are maintained in order relative to write operations and read operations are maintained in order relative to read operations. Moreover, write operations are allowed to pass read operations and write acknowledgements are used to confirm that their corresponding write operations have reached a point of coherency in the system. Ordering in the I/O subsystem is important from the perspective of any two end points. For example, if processor (EV7a) communicates with its associated IO7 (IO7a), then all operations must be maintained in order. However, communication between another processor (EV7b) and IO7a is not maintained in order. If ordering is important, another mechanism, such as semaphores between processors, may be utilized.

Deadlock Avoidance

Two types of deadlock may occur in the SMP system: intra-dimensional and inter-dimensional deadlock. Intra-dimensional deadlocks can arise because the network is a torus and the wrap-around path can cause a deadlock cycle. This problem is solved by the use of virtual channels. Inter-dimensional deadlocks can arise in any square portion of the mesh. These cycles can be eliminated if messages route all in one dimension before routing any in the next dimension or in dimension order. For example, if all messages traversed in the East-West (EW) direction before traversing in the North-South (NS) direction, no deadlock cycles can be generated because there is never a dependency from NS channels to the EW channels. The content of an RBOX configuration register selects whether the NS or EW channels are primary.

Dimension-order (i.e., deadlock-free) routing requires that a message route along a fixed path from source to destination. However, in some cases there may be multiple minimum-distance paths from source to destination. In this case, it is desired to select a path from source to destination that encounters the least network connection. This is called "minimal adaptive routing".

The EV7 processor allows for adaptive routing that is deadlock-free. Buffering is allocated for a deadlock-free network. Disposed over the deadlock-free network is an adaptive network of buffers. A message can travel on the adaptive buffers until it encounters a situation that might lead to deadlock. In this case, a message may exit the adaptive buffers and enter the deadlock-free network. Due to the nature of the deadlock-free network, that network can always make forward progress. Since the messages in the adaptive network may always drain into the deadlock-free network, the system should never deadlock. In effect, the adaptive network has dependencies on the deadlock-free network but not vice versa. A message in the adaptive buffers can re-enter the deadlock-free network at any point, just like any new message.

The SMP system allows adaptive routing to be performed based on the dynamic load in the network. However, the system is still deadlock-free because the deadlock-free network is always available. The majority of buffering is allocated to the adaptive network. There is minimal buffering in the deadlock-free network; that is, there is sufficient buffering to eliminate cyclic dependencies. The RBOX may (with the exception of I/O channel references in the normal case) start a message in either the adaptive or deadlock-free networks. When an adaptive message is blocked in the EV7 RBOX (router) due to lack of buffering, the message is converted to the deadlock-free network as space becomes available. It is also possible for the EV7 processor to convert from the deadlock-free network back into the adaptive network. Basically, the EV7 decides at each "hop" of the 2D-torus which buffer type it can use.

Generally, the following rules are followed on EV7 processors for a message to traverse the deadlock free network: (1) the message is routed in dimension-order from its current location, and (2) the message selects a virtual channel on each dimension-change. The EV7 can handle other special cases that violate these rules, such as an "L-shaped" system as well. It should be noted that messages in the I/O virtual channel are never routed adaptively.

The header of an EV7 message contains information indicating the direction that the message may take in each of the two dimensions and a value for each dimension. When the value for a given dimension equals "WHOAMI" (a stored value) of an EV7 processor at which the message has arrived, the message is assumed to have traveled sufficiently far in that dimension. When the WHOAMIs of both dimensions equal both values contained in the message, the message has reached its destination. A routing table (RBOX_ROUTE) in the RBOX holds the values that are sent along with each message, as well as the directions that a message should travel in each dimension. The routing table is consulted once as each message is sent, preferably at the source of the message. The information from the routing table is all that is required to find the destination processor. The routing table at each processor contains 276 entries, one entry for each processor in the system (plus one for each sharing mask bit).

I/O DMA Access and Exclusive Caching

The IO7 may perform direct memory access (DMA) accesses to the EV7 system memory by way of either exclusive caching or time-outs. A DMA device is contained within the IO7 and is configured to service I/O bus read and write operations. For a DMA write stream, a first way to prefetch data in multiple blocks is via a stream of read modify request (ReadModReq) commands. The second is via a stream of invalidate-to-dirty request (InvaltoDirtyReq) commands to gain exclusive access to the block (presumably to write the entire block). The InvaltoDirtyReq commands require that the write operations be full-block writes.

For a DMA read stream there are two ways to prefetch data in multiple blocks, depending on the ordering required by the DMA device. The most efficient way is to use a stream of fetch requests (i.e., non-cacheable fetch) commands, while another way is to use a ReadModReq command to obtain exclusive access to the block (often to write a portion of the block). The advantage of this latter way is that the I/O device can implement a sequentially consistent read stream since the exclusive access forces order. A disadvantage involves generation of VictimClean messages to release exclusive access to the block. Multiple DMA devices that attempt to access the same block at the same time must be serialized, as will a processor and a DMA device.

When using the DMA access and exclusive caching technique, the DMA device is expected to force the eviction of a data block (cache line) soon after receiving a forward for the cache block. The IO7 may exclusively cache copies of blocks for long periods of time. If a processor or another IO7 requests a copy of the block, the directory determines that the IO7 is the exclusive owner of the block and forwards the request to the IO7. When this happens, the directory expects to eventually receive both a ForwardMiss and a Victim (or VictimClean) response.

When the IO7 uses exclusive caching to access DMA requests, it should respond with ForwardMiss messages to every received forward request. The following is also required: (1) any currently cached blocks/TLB entries that could match the address in the forward message must be marked for eventual eviction (after a time-out); and (2) any currently pending miss addressed file (MAF) entries that could possibly match the address must be marked so that the block eventually gets evicted after it returns. It should be noted that the receipt of a forward message does not imply that the IO7 currently holds a copy of the block. That is, a victim may be on its way from the IO7 to the directory before the IO7 receives the forward message. Note also that this scheme allows the IO7 to (exclusively) cache copies of scatter-gather maps or I/O TLB entries.

When using the time-out technique, the DMA device is expected to evict blocks soon after it obtains exclusive access to the block. This allows the IO7 to ignore the forward messages. When the IO7 uses this mode to access DMA, it should respond with a ForwardMiss response to every receive forward request and otherwise ignore the forward message.

I/O Space Ordering

The EV7 processor supports the same I/O space ordering rules as the EV6 processor: load (LD)-LD ordering is maintained to the same IO7 or processor, store (ST)-ST ordering is maintained to the same IO7 or processor, LD-ST or ST-LD ordering is maintained to the same address, and LD-ST or ST-LD ordering is not maintained when the addresses are different. All of these ordering constraints are on a single processor basis to the same IO7 or processor. Multiple loads (to the same or different addresses) may be in flight without being responded to, though their in-flight order is maintained to the destination by the core/CBOX and the router. Similarly, multiple stores (the same or different addresses) can be in flight.

The EV7 processor also supports peer-to-peer I/O. In order to avoid deadlock among peer IO7 "clients", write operations are able to bypass prior read operations. This is required because read responses cannot be returned until prior write operations have completed in order to maintain PCI ordering constraints. By allowing the write operations to bypass the read operations, it is guaranteed that the write operations will eventually drain, thereby guaranteeing that the read operations will eventually drain.

Partitions

A domain is defined as a failure unit. A domain may constitute from one to many processors. The SMP system can be partitioned into domains via interprocessor register (IPR) settings. These domains provide varying degrees of isolation, survivability and sharing between domains, such as hard partitions, semi-hard partitions, firm partitions and soft partitions.

In a hard partition, there is no communication between domains. In this type of system, an EV7 processor, memory or I/O failure does not affect another domain. Each domain can be individually reset and booted via separate consoles. Proper RBOX_ROUTE, RBOX_CFG and RBOX_*_CFG settings are the primary requirement to establish a hard partition.

A firm partition allows domains to share a portion of its memory, the "global" memory, which is distributed throughout the domains. The local memory for each domain still resides within each domain. The EV7 processor can prevent domains from accessing local memory in other domains. An EV7 processor, memory or I/O hardware failure in one domain may cause corruption or fatal errors within the domain containing the failure. A hardware failure may also cause corruption or failures in other domains. The proper settings in the RBOX_ROUTE, RBOX_*_CFG, CBOX Access Control, CBOX Local Processor Set and CBOX Global Processor Set IPRs are the primary requirement to set up a firm partition.

A semi-hard partition is a firm partition with some additional restrictions and hardware reliability assurances. It requires that all communication within a domain must stay within the domain. Only sharing traffic to the global memory region may cross domain boundaries. Hardware failures in one domain can cause corruption or fatal errors within the domain that contains the error. Hardware failures in any domain can also corrupt the global region of memory. However, hardware failures in one domain will not corrupt the local memory of any other domains provided the local and global sets have been properly defined in the CBOX Local Processor Set, CBOX Global Processor Set, and CBOX Access Control IPRs and those IPRs are configured to deny access from remote processors. In addition, corruption should not occur provided the RBOX_ROUTE configuration correctly directs local traffic with a local domain, invalid sets do not cross domain boundaries and the time-out values are established to time out inter-domain channels before timing out intra-domain channels, as indicated in the time-out ordering.

A soft partition allows for all communication to cross domain boundaries. The domain is strictly a global concept in this case. The partitions can share a global portion of the memory. Each domain has a region of local memory that the other domains cannot access.

Figure 9:
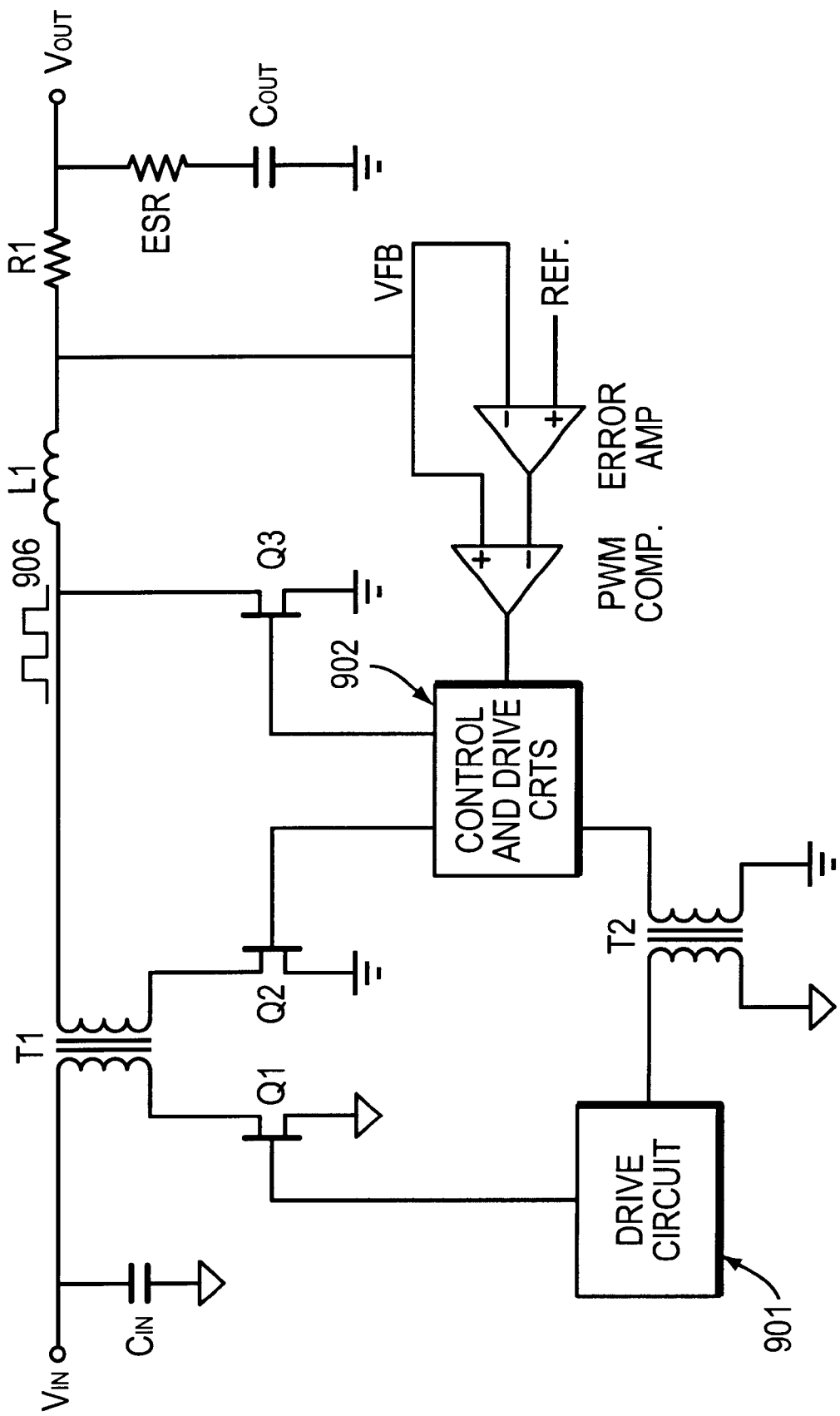
FIG. 9 is a schematic diagram of a known V²® control implementation.

FIG. 9 shows a known circuit implementation of a $V^2$® control technique as described in the CS5165 specification by Cherry Semiconductor. $V^2$® is a trademark of SwitchPower, Inc. Transformer T1, transformer T2 along with transistors Q1, Q2, Q3, drive circuit 901 and control and drive circuit 902 form a square waveform 906 from the input voltage $V_{in}$ as well as control the waveform's duty cycle. Main inductor L1 along with output capacitor $C_{out}$ smoothes the square waveform 906 to generate a DC output voltage $V_{out}$.

The $V^2$® control technique uses a ripple voltage developed across the equivalence series resistance (ESR) of the output capacitor $C_{out}$ a ramp signal in the PWM control loop. ESR is an inherent capacitor resistance. The ramp signal is proportional to the AC current through the main inductor L1 and is offset by the value of the DC output voltage. This control scheme inherently compensates for variation in either line or load conditions, since the ramp signal is generated from the output voltage itself. Stated differently, the output voltage is used to generate both the error signal and the ramp signal. Since the ramp signal is simply the output voltage, it is affected by any change in the output voltage, which allows the control circuit to drive the main switch to 0% or 100% duty cycle as required.

A change in line voltage changes the current ramp in the inductor, affecting the ramp signal, which causes the $V^2$® control scheme to compensate the duty cycle. Since the change in inductor current modifies the ramp signal, as in current mode control, the $V^2$® control scheme has the same advantages in line transient response. A change in load current will have an effect on the output voltage, altering the ramp signal. A load step immediately changes the state of the comparator output, which controls the main switch. Load transient response is determined only be the comparator response time and the transition speed of the main switch. The reaction time to an output.

A change in load current will have an effect on the output voltage, altering the ramp signal. A load step immediately changes the state of the comparator output, which controls the main switch. Load transient response is determined only be the comparator response time and the transition speed of the main switch. The reaction time to an output load step has no relation to the crossover frequency of the error signal loop , as in traditional control methods.

The error signal loop can have a low crossover frequency, since transient response is handled by the ramp signal loop. The main purpose of this "slow" feedback loop is to provide DC accuracy. Noise immunity is significantly improved, since the error amplifier bandwidth can be rolled off at a low frequency. Enhanced noise immunity improves remote sensing of the output voltage, since the noise associated with long feedback traces can be effectively filtered.

Line and load regulation are drastically improved because there are two independent voltage loops. A voltage mode controller relies on a change in the error signal to compensate for a derivation in either line or load voltage. This change in the error signal causes the output voltage to change corresponding to the gain of the error amplifier, which is normally specified as line and load regulation. A current mode controller maintains fixed error signal under deviation in the line voltage, since the slope of the maintains fixed error signal under deviation in the line voltage, since the slope of the ramp signal changes, but still relies on a change in the error signal for a deviation in load. The $V^2$® method of control maintains a fixed error signal for both line and load variation, since the ramp signal is affected by both line and load.

In most implementations a resistance R1 is added in series with the output inductor L1 to cause the output voltage to drop or fall as the load is increased. This is known as "adaptive voltage positioning" and keeps the output voltage within a specification during load transients. Resistance R1 may be either a discrete resistor or resistance in the output etch of the converter between output inductor L1 and output capacitor $C_{out}$.

Drawbacks exist with the above implementation of the $V^2$® control technique. For instance, the output ESR resistance limits the transient response of the DC-to-DC converter. Thus, to improve the transient response, it is desirable to make the ESR resistance as small as possible. One approach would be to couple several capacitors in parallel to form the output capacitor $C_{out}$. However, if the ESR resistance is too small there will not be sufficient ripple voltage generated to form the ramp signal for the $V^2$® control technique. Another drawback is that when several DC-to-DC converters are operated in parallel, if the converters share a common output capacitor $C_{out}$ and ESR resistance, this causes interactions between the control loops resulting in major stability issues. Additionally, if adaptive positioning is used, the power losses ($I^2R$) in resistance R1 reduce the efficiency of the converter.

Figure 10:
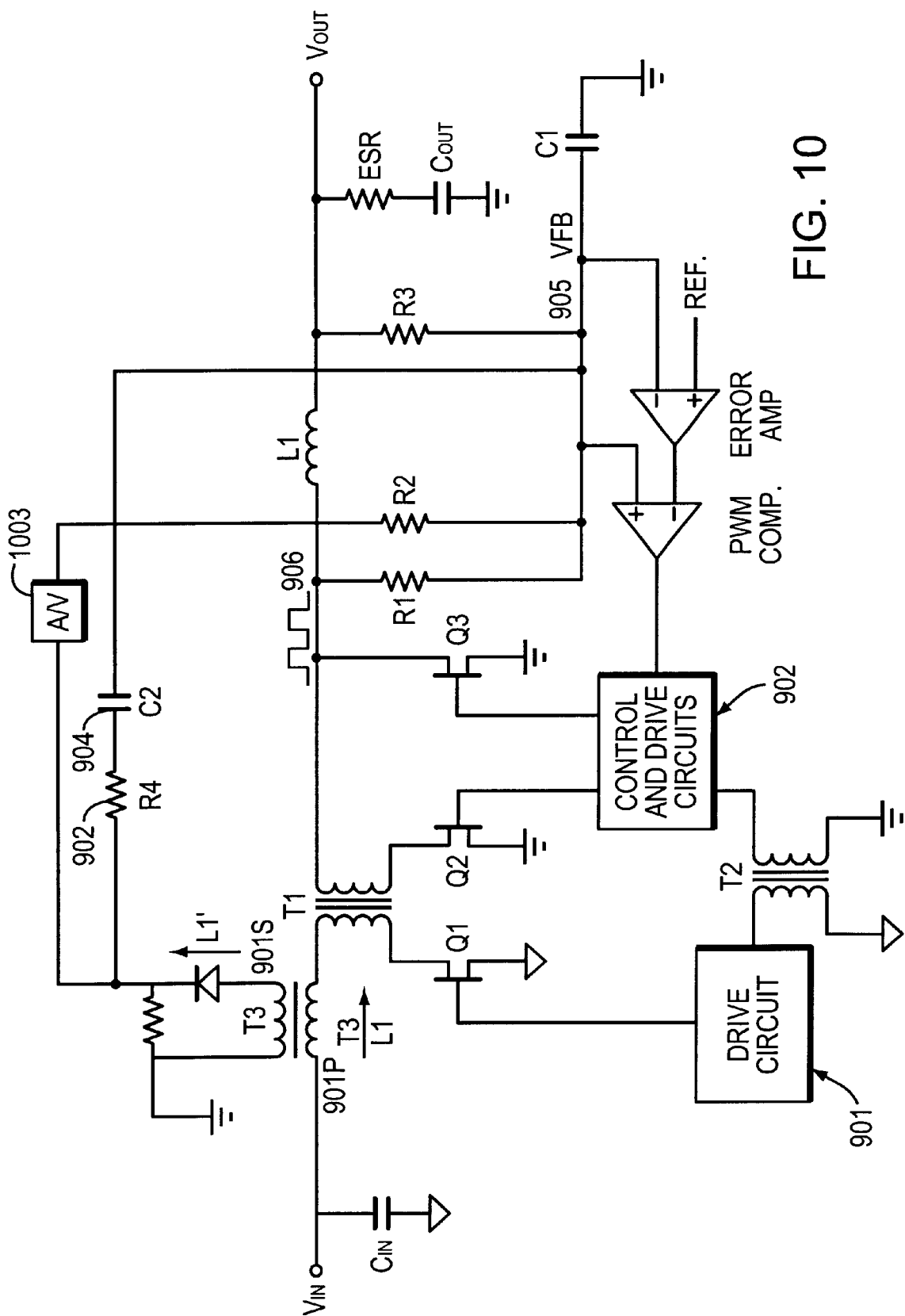
FIG. 10 is a schematic diagram of a V²® control implementation in accordance with an embodiment of the invention.

FIG. 10 shows a circuit in accordance with the principles of the invention designed to eliminate the drawbacks mentioned above, among others. Although the circuit indicates that it is for an isolated DC-to-DC converter, it equally applicable to non-isolated design as well. Instead of relying on the ESR resistance to generate the ramp signal, resistance R1, resistance R3 (to a certain degree) and capacitor C1 develop (i.e., sythesize) the ramp signal for the PWM from the switching waveform 906. Resistance R3's primary object is to provide the DC feedback to the PWM to set the output voltage DC value. However, because it is connected in parallel with R1, the parallel combination value of resistances R1, R3 (i.e., R1//R3) along with capacitor C1 are selected such that the RC time constant provides an optimal peak-to-peak ramp voltage (which according to one embodiment is 40 mV). Stated differently, from the square waveform 906, the RC time constant is made sufficiently large as to synthesize a ramp signal from the square waveform 906 that forms the output voltage itself. Optionally, resistance R4 coupled through capacitor C2 provides additional input to the PWM ramp voltage directly from the current sense transformer T3. Concerning resistance R3, additional resistance and capacitor in series may be added across resistance R3 to improve loop stability and transient response. Resistance R2 provides the adaptive voltage positioning by feeding a voltage proportional to the output DC current into the feedback loop $V_{FB}$. According to the embodiment, a current transformer is used to sense the primary current, $L_1$ which is proportional to the output current. Stated differently, if the output current increases due to increase in transient load, the primary current increases proportionally. Conversely, if the output current decreases due to decrease in transient load, the primary current decreases proportionally. A tapped primary current $L_1$, from the current transformer feeds into a Voltage/Current (V/A) circuit 1003 that converts tapped primary current $L_1$ linearly into voltage. The voltage then feeds the resistance R2. In another method, the output of the current transformer T3 is averaged and fed through resistance R2. The role of resistance R2 is that when voltage across it increases, that voltage feeds into the feedback loop $V_{FB}$ and causes the output voltage $V_{out}$ (across resistance R3) to droop. Conversely, if the voltage across resistance R2 decreases, that voltage in turn feeds into the feedback loop and causes the output voltage $V_{out}$ to increase. This method works equally well if the current transformer is in the secondary of the DC-to-DC converter or if the current is sensed using a resistance in the primary side of the DC-to-DC converter. Thus, the value of the current feedback voltage in V/A circuit 1003 and the relative value of resistance R2 with respect to resistance R3 determine the amount of droop provided. This value is typically set to 3% of the nominal output voltage from no load to full load but may be more or less depending on specific converter requirements.

While the forgoing description intends to explain a preferred embodiment of the inventive directed to a unique method of reducing losses in circuits using $V^2$® PWM control, it will be apparent to those skilled in the art that several of the described circuit components may be replaced by functional equivalents. All such equivalents are deemed to be within the scope of the present invention. For instance, each of the resistances can be replaced by resistances connected either in series or parallel and each of the capacitors can be replaced by parallel connected capacitor units. All such variations are intended to be within the scope of the present as defined in the appended claims.

What is claimed is:

1. A regulated DC power supply comprising:

an input transformer having primary and secondary windings;

an AC input source connected to apply an input to the primary winding of said input transformer;

a switched rectifier connected to the secondary winding of said input transformer and providing a rectifier output between first and second rectifier terminals;

first and second output terminals;

an inductor connected in series between said first rectifier terminal and said first output terminal;

an output capacitor connected across said first and second output terminals;

means, connected to said rectifier terminals, for generating a ramp signal from the output of said switched rectifier;

means for producing a voltage error signal based on the DC voltage between said output terminals; and means for controlling the switching of said rectifier in response to said ramp signal and said error signal.

2. The power supply of claim 1 in which said AC source applies a square wave input to the primary winding of the input transformer.

3. The power supply of claim 2, in which said ramp generating means comprises:

a first resistor and a second capacitor connected in series between said rectifier terminals, the voltage across said second capacitor being the ramp signal.

4. The power supply of claim 1 in which said switched rectifier comprises:
   a first switch in series between one end of said secondary winding and said second rectifier terminal, the other end of said secondary winding being connected to said first rectifier terminal; and
   a second switch in series between said second rectifier terminal and said first rectifier terminal.

5. The power supply of claim 3, in which said voltage error signal producing means comprises:
   a second resistor connected in series between said first output terminal and the junction between said first resistor and said second capacitor; and
   a first comparitor for comparing the DC voltage across said second capacitor with a reference voltage.

6. The power supply of claim 5 includes:
   a current sensor for sensing the current through the power supply, thereby providing a current signal corresponding to the DC current from said power supply; and
   means for summing the current signal at said junction.

7. The power supply of claim 3, in which the controlling means comprises:
   a second comparator for comparing the output of said first comparator with the voltage across said second capacitor; and
   a control circuit for producing said voltage control signal in response to the output of said second comparator and to a timing signal from said AC source.

* * * * *